US010645861B2

(12) United States Patent
Shen

(10) Patent No.: US 10,645,861 B2
(45) Date of Patent: May 12, 2020

(54) METHOD FOR SEED PRIMING

(71) Applicant: Robust Seed Technology A&F Aktiebolag, Lund (SE)

(72) Inventor: Tongyun Shen, Lund (SE)

(73) Assignee: Robust Seed Technology A&F Aktiebolag, Lund (SE)

( * ) Notice: Subject to any disclaimer, the term of this patent is extended or adjusted under 35 U.S.C. 154(b) by 110 days.

(21) Appl. No.: 15/522,898

(22) PCT Filed: Oct. 28, 2014

(86) PCT No.: PCT/EP2014/073116
§ 371 (c)(1),
(2) Date: Apr. 28, 2017

(87) PCT Pub. No.: WO2016/066189
PCT Pub. Date: May 6, 2016

(65) Prior Publication Data
US 2017/0325397 A1 Nov. 16, 2017

(51) Int. Cl.
*A01C 1/00* (2006.01)
*A01C 1/02* (2006.01)

(52) U.S. Cl.
CPC . *A01C 1/02* (2013.01); *A01C 1/00* (2013.01)

(58) Field of Classification Search
CPC ........................................................ A01C 1/00
See application file for complete search history.

(56) References Cited

U.S. PATENT DOCUMENTS

| | | | |
|---|---|---|---|
| 1,865,680 | A | 7/1932 | Dax |
| 3,013,776 | A | 2/1958 | Patterson |
| 3,765,131 | A | 10/1973 | Christensen |
| 3,906,663 | A | 9/1975 | Peng et al. |
| 3,911,619 | A | 10/1975 | Dedolph |
| 4,020,590 | A | 5/1977 | Davis |
| 4,037,359 | A | 7/1977 | Peng et al. |
| 4,385,468 | A | 5/1983 | Yoshiaki |
| 4,765,092 | A | 8/1988 | Cline |
| 4,760,987 | A | 11/1988 | Nelsen et al. |
| 4,905,411 | A | 3/1990 | Finch-Savage |
| 4,912,874 | A | 4/1990 | Taylor |
| 4,989,367 | A | 2/1991 | Chung |
| 5,119,589 | A | 6/1992 | Rowse |
| 5,232,465 | A | 8/1993 | White et al. |
| 5,628,144 | A | 5/1997 | Eastin |
| 5,873,197 | A | 2/1999 | Rowse et al. |
| 6,313,377 | B1 | 11/2001 | Schipper et al. |
| 6,314,676 | B1 | 11/2001 | Tucker |
| 6,385,902 | B1 | 5/2002 | Schipper et al. |
| 6,421,956 | B1 | 7/2002 | Boukens et al. |
| 7,181,886 | B2 | 2/2007 | Bourgoin et al. |
| 7,748,165 | B2 | 7/2010 | Santoli et al. |
| 8,381,438 | B2 | 2/2013 | Van Duijn et al. |
| 9,049,813 | B2 | 6/2015 | Notten et al. |
| 2010/0126065 | A1 | 5/2010 | Nishimura et al. |

FOREIGN PATENT DOCUMENTS

| | | | | |
|---|---|---|---|---|
| CA | 2311346 | A1 * | 6/1999 | ............... A01C 1/00 |
| CN | 101385414 | | 3/2009 | |
| EP | 0 254 569 | | 1/1988 | |
| EP | 1967057 | A1 * | 9/2008 | ............... A01C 1/00 |
| EP | 2254569 | | 11/2012 | |
| EP | 2 574 223 | | 4/2013 | |
| GB | 2 163 634 | | 3/1986 | |
| JP | 57-74006 | | 5/1982 | |
| JP | 7-289021 | | 11/1995 | |
| JP | 2006-211907 | | 8/2006 | |
| JP | 2008-154464 | | 7/2008 | |
| JP | 2012-135226 | | 7/2012 | |
| JP | 2014-093961 | | 5/2014 | |
| WO | 1988/07318 | | 10/1988 | |
| WO | 94/05145 | | 3/1994 | |
| WO | WO-9405145 | A1 * | 3/1994 | ............... A01C 1/00 |
| WO | 96/08132 | | 3/1996 | |
| WO | 99/33331 | | 7/1999 | |
| WO | 2004/000024 | | 12/2003 | |
| WO | 2008/153388 | | 12/2008 | |

(Continued)

OTHER PUBLICATIONS

Bewley, J. Derek, "Seed Germination and Dormancy", The Plant Cell, 9:1055-1066, 1997.
Di Girolamo, Giuseppe and Barbanti, Lorenzo, "Treatment conditions and biochemcial processes influencing seed priming effectiveness", Italian Journal of Agronomy, 7:e25:178-188, 2012.
Lutts, Stanley et al., "Seed Priming: New Comprehensive Approaches for an Old Empirical Technique", InTechOpen, Chapter 1, pp. 1-46.
PCT International Search Report, PCT/EP2014/073116, dated Jul. 13, 2015 (4 pages).
Bewley, J. Derek and Black, Michael, "Cellular Events during Germination and Seedling Growth", Plenum Press, New York and London, pp. 149-191, 1994.
Qichuan, Y., Principles and Techniques of Seed Processing, Zheijian University Press, pp. 110-112, 2002.
Rowse, H. R., "Drum Priming—a non osmotic method of priming seeds," Seed Science and Technology, 1996, pp. 281-294, vol. 24.
Lijun, Wang et al., "Seed Storage Processing and Calibration", Chemical Industry Press, pp. 248-249, 2009.
Ella, Evangelina S. et al., "Seed pre-treatment in rice reduces damage, enhances carbohydrate mobilization and improves emergence and seedling establishment under flooded conditions", AoB Plants, pp. 1-11, 2011.

(Continued)

*Primary Examiner* — Kristen C Hayes
(74) *Attorney, Agent, or Firm* — Honigman LLP; Fernando Alberdi; Jonathan P. O'Brien

(57) ABSTRACT

Disclosed is a method of priming dry seeds, wherein said seeds firstly wetted in a manner such that the seed absorbs at least 75 wt. % of the amount of water required by the seed for entering phase II of water uptake. Subsequently, the moisture content of the seed is reduced by at least 1 percentage unit, and in manner such that the resulting moisture content of the seed still is at least 25%. At last is the seed incubated in such a manner that: the weight of the seed during the incubation remains at least 80%, such as at least 90% or at least 95%, of the weight of the seed before the incubation; and the moisture content (dry weight based) of the seed during the incubation remains at least 25% during at least 25% of incubation time.

14 Claims, No Drawings

(56) References Cited

FOREIGN PATENT DOCUMENTS

WO    2009/002162    12/2008
WO    2014/178762    11/2014

OTHER PUBLICATIONS

Bede, Douglas, "Pregermination vs Seed Priming". Sports Turf Manager. vol. 9. Issue 2, June 1996, pp. 9-10.

* cited by examiner

METHOD FOR SEED PRIMING

CROSS REFERENCE TO RELATED APPLICATIONS

This application is a 35 U.S.C. § 371 United States National Phase application of PCT Application No. PCT/EP2014/073116, filed Oct. 28, 2014, the entire contents of which are incorporated by reference herein.

FIELD OF THE INVENTION

The present invention relates to method of seed priming, including immersion of a seed in an aqueous solution and subsequent incubation. Further, the invention relates to a seed obtainable by such a method and a plant grown from such a seed.

BACKGROUND

The influence of seed quality on final yield of crops is well known. Seed priming is a naturally and environmental friendly way to improve the seed performance. It is effective for seeds with both low and high germination capacity. In seed priming, the basic metabolic reactions needed for the seed to germinate occur under conditions of high moisture, sufficient oxygen and suitable temperature. The germination process is typically interrupted by drying the primed seed before radical emergence, i.e. before the germination process is completed. Subsequently to drying the primed seed may be packed, stored, distributed and planted in the same manner as untreated seeds.

As have been established, seed priming has several advantages for crop production and forest planting. Primed seed usually results in more rapid and uniform emergence compared to unprimed seed. Further, primed seed germinated better across a wide range of temperature, adverse field conditions, such as salinity and limited water availability, than unprimed seeds. Priming also showed effect on breakdown seed dormancy in many vegetable species. The final yield increase by seed priming can lead to increased profits justifying the additional expense of priming treatment in many species. Thus there is a need for seed priming methods.

The priming methods of the art include hydro priming, osmotic priming and matrix priming. Among these priming methods, hydro priming has the advantage that saving both the cost for chemicals/matrix used during priming and labor to remove these materials after priming. However, hydro priming need more accurate technique to both produce good result and prevents seeds from germination during priming treatment. Further, it would be desirable to provide primed seed with improved shelf-life.

To prevent the seeds from germinating during the priming, the water supplied to the seed and the incubation time have to be strictly controlled.

JP7289021 discloses a process for unifying the germination starting period of a seed and providing a high-performance coated seed capable having improved and stabilized germination performance. In the disclosed process, the seed is immersed in water to make the water content of the seed ≥30% dry weight. The prepared seed is retained in a vapor-phase environment having ≥50% relative humidity until just before germination to provide a method for unifying the germination starting period of seed.

WO 99/33331 relates to a method for treating seed with a fluid, involving the use of a fluid-containing gas in a closed chamber containing one or more heat exchange surfaces. The treatment period length is of importance, where a longer period leads to unwanted germination and a shorter treatment is described to lead to inadequate synchronicity, i.e. a large number of seeds are still in the termination resting stage since they have not taken up enough water.

U.S. Pat. No. 6,421,956 discloses a method and apparatus for treating seed with a fluid, in particular water, involving the use of a fluid-containing gas, whereby seed is brought into contact with a gas having a controlled fluid content and the seed is kept in contact with the gas over a defined period whilst direct contact between the seed and the fluid in liquid form is substantially precluded. Prior to being exposed to fluid-containing gas, the seed may be wetted to lower the osmotic pressure of the seed.

U.S. Pat. No. 5,119,589 discloses a method wherein a seed is primed by progressive hydration in a rotating drum by water introduced as steam from a steam generator to condense as a mist on the drum walls or as liquid water pumped onto the drum walls through several fine bore tubes to form a surface film. The amount of water and its rate of addition are controlled such that the seeds remain free flowing. While offering control of the priming process, the slow hydration negatively affects the efficiency of the priming. The method further requires strict control of the progressive hydration. WO 96/08132 discloses a method where seeds and water are in contact through a semi-permeable membrane, resulting in a slow hydration negatively affecting the priming and requiring strict control of the osmotic potential in the water.

Other examples include U.S. Pat. No. 5,232,465, which discloses a method where populations of grass seeds are subjected to a plurality of alternating hydration and dehydration periods. The alternation of hydration/dehydration periods pose a risk, as seeds made delicate by a high moisture content are periodically harshly treated by low humidity air. Furthermore, the high humidity air (RH 93-98%) periods require careful control for seed not to germinate.

In these methods, if the seeds were saturated when contacted with water/fluid, the incubation time should be strictly controlled to prevent seeds germination during priming. If the imbibitions were aborted before the seeds being saturated, the limitation of water, especially embryo which is usually situated inside the endosperm or pericarp, limits the priming effect. Removing the seeds too early from imbibitions, may lead to even poorer germination performance than unprimed seeds.

Finally, WO 08/153388 discloses a method of priming seed, wherein not water but rather partial oxygen pressure and/or partial carbon dioxide pressure is used to control the priming process. Limiting the availability of oxygen during the incubation may negatively affect the priming.

Thus, there is a need for a seed priming method overcoming deficiencies of the art.

SUMMARY

Consequently, the present invention seeks to mitigate, alleviate, eliminate or circumvent one or more of the above-identified deficiencies in the art and disadvantages singly or in any combination by providing a method of seed priming, wherein seeds to be primed are wetted in a manner such that the seed absorbs at least 75 wt. % of the amount of water required by the seed for entering phase II of water uptake. Before incubating the seeds, the moisture content (dry weight based) of the seeds are reduced by at least 1 percentage unit, and in manner such that the resulting moisture content of the seed still is at least 25%. The seeds are subsequently incubated in such a manner that: the weight of the seed during the incubation remains at least 80%, such as at least 90% or at least 95%, of the weight of the seed before the incubation; and the moisture content (dry weight based) of the seed during the incubation remains at least 25% during at least 25% of incubation time.

By wetting the seeds with water, the seeds are provided with sufficient water for the metabolic processes to be initiated and to proceed. In order to prevent the seeds from complete the germination process their water content are reduced.

A further aspect of the invention relates to primed seed obtainable by such method and a plant obtained by growing such a primed seed.

Further advantageous features of the invention are defined in the dependent claims. In addition, advantageous features of the invention are elaborated in embodiments disclosed herein.

DETAILED DESCRIPTION OF PREFERRED EMBODIMENTS

The uptake of water by a mature dry seed during the germination process is triphasic. During the initial phase (phase I, imbibition) rapid uptake of water takes place until a plateau phase (phase II, lag phase) is reached. During the lag phase essentially no water is taken up. For certain seeds, e.g. wheat seeds and leek seeds, some water is taken up also during the lag phase, but significantly less rapidly than during the initial phase. After the lag phase has been completed, phase III (germination, radical emergence) is initiated and water is once more being taken up by the seed rapidly. Once the seeds being contacted with water, a series of metabolic process preparing the seeds for germination, occurring during both the imbibition and the lag phase (phase II), are initiated. The most active organ during the whole germination process is the embryo, thus, the efficient water uptake of embryo is very important.

In order to avoid germination in processes in the art (cf. JP7289021 and U.S. Pat. No. 6,421,956), wherein seeds are immersed into water and subsequently incubated under an atmosphere having a high relative humidity, it is of outermost importance to control the immersion time, the osmotic pressure of the aqueous solution and the incubation time. If any of these parameters are miss-controlled, there is risk that seeds germinate during the priming process.

By shortening the immersion time, the moisture content may be kept at a level lower than one required for the seed to complete germination and preferably even lower than the moisture content required by the seed to enter phase II of the germination. Further, certain seeds, such as a seed from an endosperm specie, such as tomato, pepper, onion, castor bean, and wheat, seed from an gymnosperm species, such as Scots pine, Norway spruce, and ginkgo bilopa, or species with pericarp, such as sugar beet, carrot, and various grass species, have a delayed water transport from endosperm to the embryo of the seeds, or from pericarp to the seed inside the pericarp. Shortening the immersion time will limit the water uptake of embryo (in case of endosperm seed) or seeds (in case of seed with pericarp). This implies the risk of hampering the metabolic reactions taking place during germination, as the seed organ situated inside the seed, such as embryo, have not fully entered the phase II. If a too short immersion time is being used, the seeds may even germinate poorer than unprimed seeds (both with longer germination time and lower germination capacity).

In seed priming processes wherein the seed is allowed to absorb sufficient water for completing the germination, strict control of the incubation phase is necessary to avoid germination. Typically, the incubation is aborted well before the metabolic preparation for germination has finished. Thus, complete priming is not obtained.

The present inventor has found that the risk for germination during priming may be minimized by reducing the moisture content of the seeds once sufficiently wetted to enter phase II of the water uptake, whereby both the embryo and the surrounded endosperm have quickly got enough water to start the preparation process for germination. However, complete germination is prevented by the reduction of seed's moisture content.

During the moisture reduction after completed wetting, the major part of the moisture loss occur in the surface organ of the seeds, such as endosperm (in case of endospermic seeds and gymnosperm seeds), and pericarp (in case of seeds surrounded with fruit part). While in the embryo, being the most active and important organ of the seed, the moisture content will remain sufficient for full metabolic process a time longer after moisture reduction as the water transport between seed organs take time. Wetting the seed in a manner such that the seed absorbs at least 75% of the amount of water needed for entering phase II of the water uptake provides the embryo with enough water to start the biological processes for germination, while complete germination is prevented by reducing the moisture content of the seed before incubating the seed.

One advantage of such a moisture reduction subsequent to the wetting is that the metabolic preparing processes of germination may proceed nearly to completion, but completion of the germination, i.e. radical penetration through the seed surface, is inhibited. The inhibition may be due to the dryer hard surface of the seed. By reducing the moisture content (dry weight based) of the seed by at least 1 percentage unit, such a dryer hard surface may be obtained, whereby the risk for germination during the incubation is lowered. Thus, it is less crucial to carefully control the incubation time. Providing the seed with at least 75% of the amount water required by the seed for entering phase II of water uptake, provides the seed with enough water to start the preparation process for germination, while complete germination is prevented by reducing the moisture content of the seed and harden the seed surface. Without being bound to any theory, it is believed that harden the seed surface contributes to increasing the pressure potential of the seed.

According to an embodiment, a method of seed priming, in which the seed is allowed to absorb at least 75 wt. % of the amount of water required for entering phase II of water take, and not requiring strict control of the subsequent incubation time, is provided. In such a method, the moisture content of the seed is reduced subsequent to the wetting step. Reducing the moisture content will harden the surface of the seeds. Further, by reducing the moisture content, the seed will not germinate even if the incubation time is increased somewhat.

The moisture content (dry weight based) of the seed is to be reduced by at least 1 percentage unit. Further, the moisture content is to be reduced in a manner such that the resulting moisture content of the seed is at least 25 wt. %. Reducing the moisture content below 25 wt. % has been found to result in much less effective priming, if any. In addition, it is preferred to reduce the moisture content in a manner such that the resulting moisture content of the seed not is sufficient for the seed to complete germination. However, already a reduction of the moisture content by at least 1 percentage unit in it self provides an effect, as the surface of the seeds are harden.

In such a method, a seed to be primed is first provided. Typically, the seed is dry or at least essentially dry. The seed is wetted by an aqueous solution. The wetting may be performed by immersing the seed into an aqueous solution and removing once it has absorbed sufficient water for completing germination. Immersing the seeds into an aqueous solution was found to be an effective way of quickly saturating the seeds with water. Further, immersion implies that all seeds being immersed have unlimited access to water and hence effectively may absorb water. The metabolic preparing process of germination may thereby start very quickly.

The seed may further be wetted through, rinsing, sprinkling, dampening, dipping, soaking, splashing, spraying or using other wetting methods where the seeds are in direct contact with an aqueous solution. The method should provide the seeds with unlimited access to water. Rapid absorption of water is important, as methods wherein the access is restricted, e.g. osmotic priming, has been shown to be less effective.

The seed is to be wetted in a manner such that the seed absorbs at least 75 wt. % of the amount of water required by the seed for entering phase II of water uptake. Although such moisture content levels are not sufficient for the seed to enter phase II of water uptake, which is preferred, at lot of metabolic activity preparing seed germination are initiated and significant positive effects of seed priming have been shown already at this moisture level.

According to an embodiment, the seed is wetted in a manner such that the seed absorbs at least 95 wt. %, such as at least 97 wt. %, 99 wt. %, or 99.5 wt. % of the amount of water required by the seed for entering phase II of water uptake. Further, the seed may be wetted in a manner such that the seed at least absorbs sufficient water for entering phase II of water uptake.

Both incubation time and moisture content is crucial for seed germination, and these two factors negatively correlate, the higher the MC, the shorter the incubation time. Although a shorter incubation time is most often desired, it may be easier to control the incubation time if the time span is longer. For several species, like lettuce and wheat, the germination time is very short, just several hours. This implies that both the wetting time and the time to complete the metabolic process, i.e. the incubation time, are very short and require more delicate control. For such seeds, the duration of the wetting may be shorter than the time needed to enter phase II of the water uptake, thus prolonging the incubation time span to easier control the incubation time and minimizing the intermediate dry damage of the seeds.

It may further be advantageous to let the duration of the wetting only be slightly longer than the time needed to enter phase II to minimize intermediate dry damage of the seeds. The duration of the wetting may be 1 to 20%, such as 2 to 10% or 2 to 5%, longer than the time needed to enter phase II of the water uptake.

In other embodiments, the duration of the wetting may be up to 50% longer, such as up to 40%, 30% or 20% longer, than the time needed to enter phase II of the water uptake.

Stimulating hormones, such as Gibberelins, BAP, plant nutrients, such as Microplan, and/or salts, such as $K_2NO_3$, $CaCl_2$, NaCl, may be present in the aqueous solution. Such additives may contribute to breaking seed dormancy and producing strong and stress tolerant seedlings.

Wetting the seeds by providing unlimited access to water and in direct contact with an aqueous solution, such as by immersing the seeds in water, with subsequent moisture reduction, may effectively remove growth/germination inhibitors present in the pericarp, such as sugar beet, such as carrot.

The wetting time should be at least sufficient to allow the seed to absorb 75 wt. % of the amount of water required by the seed for entering phase II of water uptake, but much shorter than the time required for the seed to enter phase III of water uptake, as entering phase III corresponds to completing germination.

The time span for the entering phase II of the water uptake for a given seed may be determined experimentally, such as by immersion of dry seeds from a species of interest and subsequently determining the moisture content of the seeds, such as in accordance with the ISTA rule. Once the seeds are contacted with water, i.e. wetting initiated, the seeds start to absorb water until entering phase II of water uptake (this may be denoted saturation of the seed). For seeds absorbing water also during the lag phase (phase II), the intersection between the rapid uptake during the initial phase and the slow uptake during the lag phase may be used to determine the lower limit for the wetting step. The entry into phase III corresponds to radical emergence. The wetting time required by a seed for entering phase III, may thus be determined by continuously wetting a seed and observing radical emergence.

If the wetting time is too long, intermediate reduction of the moisture content may damage the seeds as the metabolic processes have gone too far, and the seeds become sensitive. Thus, the wetting time should be less than 50%, such as less than 40%, 30%, 20%, or 10%, of the time required for continuously hydrated seeds of the same species to germinate, i.e. entering phase III of water uptake. Once a radical emerge, germination is deemed to have taken place.

According to an embodiment, the duration of the incubation step at least corresponds to the difference between the time needed to enter phase II and III, respectively, of the water uptake for a seed with free access to water. In order to have the metabolic preparation for germination proceeding as far as possible, the incubation time may be selected to be equal or slightly longer than the time needed for a seed having free access water to complete germination. According to an embodiment, the duration of the incubation at least corresponds to the difference between the time needed to enter phase II and III, respectively, of the water uptake for a seed with free access to water (water potential zero), but is not longer than 3 times this difference, such as not longer than 2 or 1.5 times this difference.

The aqueous solution is typically aerated during the immersion step. Except water, oxygen is also essential for seeds to complete germination. Like water uptake, oxygen uptake also have three phases: the sharp oxygen uptake phase (phase I) is simultaneous with increased hydration/imbibitions. During this phase the oxygen attributed to activation of the respiration enzymes; during the lag phase (phase II), the oxygen uptake is slower than phase I, but increase during the whole phase in connection with respiration of the new synthesized mitochondria; a second sharp oxygen uptake (phase III) simultaneously with the radical emergence.

Shortage of oxygen supply during the germination period may lead to less energy production, which will limit the metabolic process during the germination. Serious oxygen deficiency can lead to fermentation, which will inhibit seed germination. Further, the $CO_2$ accumulating during germination process can also limit, or seriously inhibit seeds respiration, and thus, limit the priming result. Controlling the priming by increasing the partial pressure of $CO_2$ may thus affect the priming negatively.

To meet the oxygen demand during imbibitions, the present method, according to an embodiment, uses aerate aqueous solution in the wetting step to optimize the priming effect.

Subsequent to the wetting step, the moisture content is reduced. According to an embodiment, the water content of the seed is reduced in a manner such that 1 to 80%, such as 1 to 60%, 2 to 30%, 2 to 20%, or 2 to 8%, of the weight gained during the wetting of the seed is lost in the step of reducing the water content of the wetted seed. Typically, the weight of the seed is reduced by 1 to 10%, such as 2 to 8%. The weight of the seed may be reduced by about 5%.

Drying with air having low relative humidity, such less than 40%, may be used. Further, vacuum, low pressure, or low speed centrifugation at an RCF (relative centrifugal force) of not more than 500, or a combination thereof may also be used to reduce the water content. The drying may be performed at slightly elevated temperature, such as at temperature between 25 and 35° C.

In order to provide a seed with a harden surface, the moisture content is preferably reduced by blowing air at the seeds. The air may have relative humidity of less than 40% and temperature between 25 and 35° C.

The step of reducing the moisture content of the seed is typically a rapid step, i.e. a step having short duration. According to an embodiment, the duration of the step of reducing the water content is equal or shorter than one tenth, such as equal or shorter than one twentieth, one fiftieth or one hundredth, of the time needed for such a seed of the same species to germinate, if having free access to water. Further, the duration of the step of reducing the water content may be equal or shorter than one tenth, such as equal or shorter than one twentieth, one fiftieth or one hundredth, of the duration of the incubation step.

It is to be noted that, for the endosperm seeds and gymnosperm seeds, the embryo are protected/surrounded by the endosperm. For the perisperm species, such as sugar beet, the embryo are protected by the pericarp, which is a dead part covering/protecting the seed inside. These kinds of seeds are therefore more tolerant to physical stress. Further, the immersion time is typically relatively short. Consequently, the biological processes have not progressed very long once the immersion is aborted. Therefore, the mild moisture reduction measures applied did not show any negative effect on subsequent germination to both endosperm seeds and seeds with pericarp.

Once the water content of the saturated seed has been reduced, the seed is incubated in order for the metabolic preparation for complete germination. According to an embodiment, the seeds are incubated under an atmosphere of air having a relative humidity of between 80 to 100%, such as 80 to less than 95%, at least 95% but less than 100%, or 100%. While the relative humidity may be 100%, the atmosphere of air should preferably not be over-saturated, such that the moisture content of the seed during the incubation remains less than the moisture content required by the seed to complete germination.

Not only is the relative humidity of the atmosphere of air of importance for maintaining the desired moisture content during the incubation, but also the air flow. During the incubation the atmosphere of air is continuously, or discontinuously, replaced. Replacement the atmosphere of air discontinuously, implies that the air flow is intermittent.

To achieve good priming, the incubation should be performed in a manner such that the moisture content of the seed during the incubation remains fairly constant during the incubation. Preferably, the moisture content of the seed during the incubation should remain less than the moisture content required by the seed to complete germination. Further, the weight of the seed during the incubation should remain at least 80%, such as at least 90% or at least 95%, of the weight of the seed before the incubation. While it is preferred that the moisture content (dry weight based) of the seed remains at least 25% during the entire incubation, it is sufficient if the moisture content (dry weight based) remains at least 25% during 25% of the incubation time.

According to an embodiment, the weight of the seed during the incubation remains within 20%, such as within 10, 5.0, or 2.5%, of the weight of the seed the before the incubation.

The air in the atmosphere under which the seed is incubated has oxygen content of 15 to 25 vol. %, preferably about 21 vol. %.

As mentioned above, except water, oxygen is also essential for seeds to complete germination. Lower oxygen levels or lack of oxygen supply during the germination period may lead to less energy production from respiration, which will limit the metabolic process. Serious oxygen deficiency can lead to fermentation, which will inhibit seed germination. Thus, the seeds are incubated under an atmosphere of air, whereby providing the seeds with oxygen for the respiration process.

In order to provide essentially equal conditions for each seed in the incubation step, if several seeds are to be primed simultaneously, as the case often is, the seed may be tumbled during the incubation step. Such tumbling may be performed in a rotating barrel provided with baffles. An embodiment, relates to rotating barrel provided with baffles for incubating seeds according to the present method.

During the initial phase (phase I) and lag phase (phase II), during which various metabolic processes take place, oxygen is being consumed by the seed. Further, various gaseous substances are emitted. It may thus be advantageous to continuously, or discontinuously, replacing the atmosphere of air during the incubation step.

Further, oxygen is being consumed by the seed also during metabolic processes initiated during the first phase of germination (phase I of water uptake). It may thus be advantageous to aerate the aqueous solution during the immersion step. Further, aeration may contribute to facilitate diffusion of various components during the immersion step and to more even uptake of water by the seeds.

Subsequent to the incubating step the primed seed may be sowed. More commonly however, the water content of the primed seed will be reduced subsequent to the incubating step, in order to allow for storage and transport of the primed seed. The seeds may be dehydrated, i.e. the water content reduced, by drying the seeds with air. The relative humidity of the air is low, such as ≤40%, such as about 25%. Further, the drying may be performed at slightly elevated temperature, such as at temperature between 25 and 35° C. The water content of the seeds is preferably decreased to a level for safe storage.

Various types of seed may be primed using the priming method disclosed herein. The method is especially suited for priming seeds from an endosperm specie, such as tobacco, tomato, pepper, castor bean, onion, wheat; a gymnosperm species, such as pine, spruce, Ginkgo biloba; and a perisperm seed with/without a pericarp, such as sugar beet.

According to an embodiment, the seed to be primed is a seed:
- from an endosperm species, like tomato or pepper;
- from a gymnosperm species, like pine or spruce;
- from perisperm species, like red beet; and/or
- having a pericarp, like carrot or grass.

Another embodiment of the invention relates to a primed seed, which seed is obtainable by the method disclosed herein. Such seeds will have decreased mean germination time, increased germination capacity and/or improved outdoor soil emergence and field performance. A further embodiment, relates to a plant obtained by growing a primed seed obtainable by the method disclosed herein.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

EXPERIMENTAL

The following examples are mere examples and should by no mean be interpreted to limit the scope of the invention. Rather, the invention is limited only by the accompanying claims.

Determination of Immersion Time

The immersion time was determined by moisture content determination according to ISTA rule ((International Seed Test Association, Determination of moisture content in International rules for seed testing) at determined interval until that the increase of moisture content of seeds becomes very slow. For Kentucky blue grass, the moisture content of the seeds increases very slowly after 135 minutes. So the immersion time is determined to be 135 minutes. After the immersion, the moisture content of the seed may also be determined, such as for Kentucky blue grass 50%.

By determining the moisture content at a determined interval, the immersion time required for reach different degrees of saturation is also defined.

Determination of Incubation Time

The time needed for the seed to germinate, once immersed into water, was determined by incubating the seed without firstly reducing its water content. For Kentucky blue grass, the time needed for the seed to germinate, once immersed into water, was determined to be 84 hours.

Immersion

The seeds (Paprika 20 g, Wheat 500 g, Scots Pine 100 g, Kentucky blue grass 400 g) were immersed in a bucket with discontinuously manual stirring in water (5 times the amount of seeds w/w) aerated with fresh air bubbles for a predetermined immersion time (cf. above), such as 135 minutes for Kentucky blue grass.

Intermediate Water Reduction

The moisture of the seeds were reduced by—centrifugation for 6 minutes at RCF=500, and dried at 35% RH ambient condition until the moisture content of the seeds were 2-5 percentage of unit lower than the moisture content before the immersion, such as to 45% for Kentucky blue grass.

Incubation

After moisture reduction, the seeds were placed in a tumbling device and incubated under atmosphere of fresh air having a relative humidity of 95% for a determined incubation time (cf. above), such as 84 hours for Kentucky blue grass.

Drying

After incubation the seeds were dried at ambient with 30% RH at about 30° C. until the moisture content of the seeds reduced to the same moisture as before the immersion, such as 8.9% for Kentucky blue grass Priming of Seeds Priming was performed according to the method described above for the 4 species (Paprika, Wheat, Scots pine, and Kentucky blue grass). The incubation time, incubation moisture content (MC) of seeds, dry seed moisture content (MC) and immersion time were determined according to the methods described above and summarized in table 1.

TABLE 1

Priming treatment data

| Category | Species | Dry seed MC* (%) | Immersion time (min) | Incubation MC* (%) | Incubation time (hour) |
|---|---|---|---|---|---|
| Vegetable | Paprika | 11.7 | 90 | 50 | 75 |
| Crop | Wheat | 14 | 240 | 30 | 24 |
| Forest | Scots pine | 6.5 | 250 | 30 | 60 |
| Grass | Kentucky blue grass | 8.9 | 135 | 50 | 84 |

*MC = moisture content

Results—Priming Performance

The priming effect on decreasing mean germination time (MGT), increasing germination capacity (GC), as well as seedling emergence time, seedling length and seedling fresh weight for the various seed specie is presented in table 2. The seedling size (seedling length and seedling fresh weight) provided in table 2 were weight of various numbers of seedlings and length of seedlings recorded after various periods of times as indicated below:

Paprika, length day 16, weight 30 seedlings;

wheat, length day 8, weight, 10 seedlings;

Scots pine, length day 15, weight 30 seedlings; and

Kentucky blue grass, length day 15, weight 40 seedlings.

TABLE 2

Priming effect on germination time, germination capacity and seedling length and seedling weight

| Category | Species | Treatment | Lab Germination | | | | Soil emergence | | | |
|---|---|---|---|---|---|---|---|---|---|---|
| | | | MGT (h) | MGT decrease (%) | GC % primed | GC increase (%) | First count time (day) | GC (%) first count time control | seedling length (mm) | Fresh weight (g) |
| Vegetable | Paprika | Primed | 104.7 ± 3.8 | 36.1 | 94 ± 1.4 | 8 | 11.5 | 86.7 ± 14 | 55 | 1.08 |
| | | Control | 164 ± 1.9 | | 86 ± 1.4 | | 14.5 | 26.5 ± 9.2 | 20 | 0.38 |
| Crops | Wheat | Primed | 64.6 ± 0.3 | 18.9 | 86 ± 2.8 | 0 | 4.1 | 72.5 ± 17 | 77 | 1.51 |
| | | Control | 87.7 ± 0.1 | | 86 ± 0 | | 4.1 | 25 ± 0 | 50 | 1.41 |
| Forestry | Scots pine | Primed | 89.9 ± 0.6 | 16.5 | 99 ± 0.7 | 4 | 8.8 | 43.4 ± 4.7 | 56 | 1.12 |
| | | Control | 107.7 ± 1.8 | | 95 ± 2.1 | | 9.8 | 4.9 ± 2.3 | 45 | 0.93 |
| Grass | Kentucky blue grass | Primed | 137.5 ± 8.6 | 41.9 | 92.7 ± 2.1 | 5.4 | 7 | 66.7 ± 12 | 52.5 | 0.61 |
| | | Control | 236.8 ± 8.1 | | 87.3 ± 2.3 | | 11 | 5.8 ± 5.8 | 12.5 | 0.38 |

As can be seen from table 2, the current priming method significantly decreased MGT, and improved the germination capacity (except for wheat, which the GC kept same as unprimed seeds). The current priming also significantly improved outdoor emergence performance, such as shorted emergence time and increased seedling size.

Example 2 To 6—General Note

Immersion and incubation times were determined in the same manner as for example 1.

For the example 2 to 6, the seeds were placed in a container made from a stainless steel net, through which water and gas could freely exchange. The container with the seeds in was placed in a tank containing water, such that the seeds are immersed in the water. The container was continuously tumbled to ensure that all seeds were homogeneously wetted. The water in the immersion tank was aerated continuously with fresh air bubbles. The seeds were immersed for a determined immersion time (cf. above).

After immersion, the moisture content of the seeds were reduced by centrifugation for 6 minutes at RCF=500, and dried at 35% RH ambient condition until the moisture content of the seeds were 2-5 percentage of unit lower than the moisture content of fully imbibed seeds.

After intermediated moisture reduction, the seeds were placed back to the container as for the immersion. The container was placed in an incubator device with continuously tumbling, with 98-100% RH air for predetermined incubation time.

After incubation, the seeds were dried at ambient with 30% RH at about 30° C. until the moisture content of the seeds reduced to the same moisture as before the immersion.

Example 2—Effects of Reducing the Level of Moisture Content (MC)

In the seed treatment process (imbibition, MC reduction, incubation and drying), the intermediate MC reduction is of high importance. To gain better understanding of the MC reduction step, the following example experiments were conducted:

1. 25 g seeds were imbibed in 20 degree water for a predetermined time to immerse the seeds with water.
2. Subsequently, the MC of the seeds were reduced in a manner (relative humidity/air flow and at 25° C.) such that the imbibed seeds reach the following MC within 30 min:
   a. 1-5% less than immersed seeds
   b. To a MC of about 25% (dry weight based)
3. The MC reduced seeds were incubated at an environment such that the seeds MC did not decrease or increase by more than 1-5%. This step took place in a container of about 1.5 liter volume. The container was made by a stainless metal net. The container was placed in an incubator with a humidity of about 99%. The net of the container allowed gas exchange between the container and the incubator.
4. After incubation, the seeds were dried back to the initial MC as before imbibition for safe storage.
5. The incubation moisture content (MC) of seeds, incubation time and priming effect on decreasing mean germination time (MGT) and increasing germination capacity (GC) were determined according to the methods described above.

TABLE 3

Reducing the level of moisture content (MC)

| Species/Variety | MC (%) | Time | MGT (h) | STD MGT | MGT decrease (%) | GC (%) | STD GC | GC increase (%) |
|---|---|---|---|---|---|---|---|---|
| Red Fescue | Control | | 122.5 | 1.3 | | 61 | 14 | |
| Red Fescue | 60* | 52 | 90.5 | 8.2 | 26.1 | 71.5 | 8.1 | 10.5 |
| Red Fescue | 25 | 52 | 121.2 | 4.1 | 1 | 56.5 | 9 | -4.5 |
| Leek Ne | Control | | 92.2 | 2.7 | | 78 | 6.7 | |
| Leek Ne | 50* | 67 | 58.1 | 2.3 | 36.9 | 87.5 | 5 | 9.5 |
| Leek Ne | 25 | 67 | 91.8 | 2.5 | 0.4 | 83 | 4.8 | 5 |
| Leek Nu | Control | | 102 | 3.2 | | 88.5 | 6.2 | |
| Leek Nu | 55* | 96 | 76.3 | 2.6 | 25.1 | 88 | 3.3 | -0.5 |
| Leek Nu | 25 | 96 | 98.2 | 1.9 | 3.7 | 89 | 3.8 | 0.5 |

TABLE 3-continued

Reducing the level of moisture content (MC)

| Species/Variety | MC (%) | Time | MGT (h) | STD MGT | MGT decrease (%) | GC (%) | STD GC | GC increase (%) |
|---|---|---|---|---|---|---|---|---|
| Carrot Ne AG | Control |  | 74.3 | 3 |  | 76.5 | 3.8 |  |
| Carrot Ne AG | 48* | 68 | 50.7 | 0.2 | 31.7 | 84.5 | 5 | 8 |
| Carrot Ne AG | 25 | 68 | 73.8 | 0.8 | 0.6 | 81.5 | 5.7 | 5 |
| Paepper Nu | Control |  | 136.9 | 2.7 |  | 98.5 | 3 |  |
| Paepper Nu | 48* | 96 | 103 | 0.7 | 24.7 | 98 | 1.6 | −0.5 |
| Paepper Nu | 25 | 96 | 142.7 | 3.3 | −4.2 | 99 | 1.2 | 0.5 |
| Tomato Ne A | Control |  | 86.5 | 3.2 |  | 93 | 3.8 |  |
| Tomato Ne A | 38* | 68 | 47.4 | 1.4 | 45.2 | 96 | 2.8 | 3 |
| Tomato Ne A | 25 | 68 | 78 | 0.9 | 9.8 | 91 | 6 | −2 |
| Wheat Ju | Control |  | 67.8 | 1.3 |  | 87 | 2.6 |  |
| Wheat Ju | 35* | 30 | 53.3 | 0.5 | 20.6 | 87 | 3.5 | 0 |
| Wheat Ju | 25 | 30 | 52.3 | 1 | 7.2 | 91.5 | 1.9 | 4.5 |

*water content reduced to 1-5% less than for immersed seeds.

Results—Effects of Reducing the Level of Moisture Content (MC)

The priming effect on mean germination time (MGT) and germination capacity (GC) for different levels of MC (dry seed based) reduction is presented in table 3. As can be seen from table 3, significant decrease in MGT (h) is observed in trials where the intermediate water reduction ranges from the just below the water required by the seed to complete germination to as low as 25%.

Example 3—Effects of Gradual Decrease of Moisture Content (MC) During Incubation In the seed treatment process (imbibition, MC reduction, incubation and drying), both gas humidity and gas flow will influence the MC during incubation. The MC of the seeds can be increased during incubation if the MC of the seeds is relative low and the RH of the gas is high enough. However, as for the relative high MC of the seeds before incubation for the current priming art, in most case, the MC of the seeds has tendency to decrease if the RH of the gas is not high enough. To illustrate the influence of the MC decrease during the subsequent incubation, the following example experiments were conducted:

1. Each sample containing 10 g of seeds was imbibed in 20° C. water for a predetermined time as described previously to saturate the seeds with water.
2. The MC of the seeds was decreased gradually during incubation, such that the MC of the seeds were reduced to 25% (dry weight based) (both through MC reduction before incubation and MC decrease during incubation) with three different speed during incubation periods. The speed during which the MC was reduced to 25% (dry weight based) was; about 10% of the normal incubation time; about 25% of the normal incubation time; and about 50% of the normal incubation time.
3. After the MC reduction, incubation was continued, with reduced MC, to fulfill the predetermined incubation time.
4. The seeds were dried to the initial MC as before immersion after the incubation for safe storage.
5. The incubation moisture content (MC) of seeds, incubation time and priming effect on decreasing mean germination time (MGT) and increasing germination capacity (GC) were determined according to the methods described above.

TABLE 4

Reduction of MC over time

| Species/Variety | MC (%) | Time | MGT (h) | STD MGT | MGT decrease (%) | GC (%) | STD GC | GC increase (%) |
|---|---|---|---|---|---|---|---|---|
| Leek Nu | Control |  | 106.6 | 6.2 |  | 86 | 4.3 |  |
| Leek Nu | 55* | 92 | 79.5 | 4.2 | 25.4 | 88.5 | 3.8 | 2.5 |
| Leek Nu | 55→18 (<60 min) | 92 | 102.9 | 1.9 | 3.5 | 89 | 3.8 | 3 |
| Leek Nu | 55→18 (<10% T) | 92 | 108.7 | 5.8 | −1.9 | 84.5 | 6.4 | −1.5 |
| Leek Nu | 55→18 (<25% T) | 92 | 96.7 | 3.6 | 9.2 | 86.5 | 4.1 | 0.5 |
| Leek Nu | 55→18 (<50% T) | 92 | 100.1 | 2.6 | 6 | 88.5 | 3.4 | 2.5 |
| Species |  |  |  |  |  |  |  |  |
| Carrot Ne AG | Control |  | 67.9 | 1.2 |  | 79.5 | 2.5 |  |
| Carrot Ne AG | 55* | 72 | 36.9 | 1.2 | 45.6 | 81 | 6.2 | 1.5 |
| Carrot Ne AG | 55→18 (<60 min) | 72 | 73.8 | 0.8 | −8.6 | 81.5 | 5.7 | 2 |
| Carrot Ne AG | 55→18 (<10% T) | 72 | 72.5 | 3.5 | −6.3 | 79.5 | 1 | 0 |
| Carrot Ne AG | 55→18 (<25% T) | 72 | 61.8 | 1.9 | 8.9 | 73.5 | 9.3 | −6 |
| Carrot Ne AG | 55→18 (<50% T) | 72 | 59.2 | 3 | 12.8 | 76 | 4.3 | −3.5 |
| Tomato Ne A | control |  | 82.8 | 2.4 |  | 89.5 | 2.5 |  |
| Tomato Ne A | 42* | 68 | 36.8 | 0.9 | 55.5 | 94.5 | 3.4 | 5 |
| Tomato Ne A | 42→18 (<60 min) | 68 | 76.9 | 1.1 | 7.1 | 92 | 2.3 | 2.5 |
| Tomato Ne A | 42→18 (<10% T) | 68 | 75.3 | 1.2 | 9.1 | 90.5 | 3 | 1 |

TABLE 4-continued

| | MC (%) | Time | MGT (h) | STD MGT | MGT decrease (%) | GC (%) | STD GC | GC increase (%) |
|---|---|---|---|---|---|---|---|---|
| Tomato Ne A | 42→18 (<25% T) | 68 | 60.3 | 1.5 | 27.2 | 93 | 2.6 | 3.5 |
| Tomato Ne A | 42→18 (<50% T) | 68 | 62.5 | 1.5 | 24.5 | 92.5 | 3.4 | 3 |

*water content reduced to 1-5% less than for immersed seeds.

Results—Effects of Gradual Decrease of MC

As can be seen in table 4, the priming effect on mean germination time (MGT) and germination capacity (GC), is most effective when the water content is reduced 1-5%. However, a positive effect can still be shown if the MC (dry weight based) of the seeds during the incubation remains at least 25% during at least 25% of incubation time. For the other examples, the fast decrease in MC during incubation limits or disrupts the positive effects of priming.

Example 4—Effects from the Degree of Imbibition

To show the importance of the imbibing step, the following example experiments were carried out:
1. Sample of 10 g seeds were imbibed for different time periods, such that after imbibition the MC of the seeds were 25% (dry seeds based), 50% of fully imbibed seeds, and 75% of fully imbibed seeds.
2. The seeds with different imbibition degree were incubated following the same protocol as for normal incubated seeds, but the respective MC, as after imbibition, was kept during the incubation (no intermediate drying step).
3. The seeds were dried to the initial MC as before imbibition after the incubation.
4. The incubation moisture content (MC) of seeds, incubation time and priming effect on decreasing mean germination time (MGT) and increasing germination capacity (GC) were determined according to the methods described above.

TABLE 5

| | MC (%) | Time | MGT (h) | STD MGT | MGT decrease % | GC (%) | STD GC | GC increase % |
|---|---|---|---|---|---|---|---|---|
| Species/Variety | | | | | | | | |
| Leek Nu | Control | | 106.6 | 6.2 | | 86 | 4.3 | |
| Leek Nu | 55* | 92 | 79.5 | 4.2 | 25.4 | 78.5 | 3.8 | -7.5 |
| Leek Nu | 41 (75% im) | 92 | 99.3 | 5.5 | 6.8 | 88 | 6.3 | 2 |
| Leek Nu | 19 (25% dw) | 92 | 99.9 | 6.5 | 6.2 | 91.5 | 3.4 | 5.5 |
| Species | | | | | | | | |
| Carrot Ne AG | Control | | 67.9 | 1.2 | | 79.5 | 2.5 | |
| Carrot Ne AG | 55* | 72 | 36.9 | 1.2 | 45.6 | 81 | 6.2 | 1.5 |
| Carrot Ne AG | 41.2 (75% im) | 72 | 53.1 | 1.2 | 21.7 | 79 | 6.6 | -0.5 |
| Carrot Ne AG | 18 (25% dw) | 72 | 72.4 | 3.3 | -6.6 | 78.5 | 5.7 | -1 |
| Tomato Ne A | control | | 82.8 | 2.4 | | 89.5 | 2.5 | |
| Tomato Ne A | 42* | 67 | 36.8 | 0.9 | 55.5 | 94.5 | 3.4 | 5 |
| Tomato Ne A | 31.5 (75% im) | 68 | 51.5 | 1.4 | 37.8 | 91 | 2.6 | 1.5 |
| Tomato Ne A | 17 (25% im) | 68 | 83.6 | 1.5 | -0.9 | 87.5 | 1.9 | -2 |

*water content reduced to 1-5% less than immersed seeds.

Results—Effects from the Degree of Imbibition

The effect of imbibition on the priming effect on mean germination time (MGT) and germination capacity (GC) is presented in table 5. As can be seen from table 5, low imbibition disrupts the positive effects of priming, i.e. the seeds were not sufficiently hydrated for the priming. It can thus be concluded that it is important for the seed to initially reach the MC required by the seed to complete germination, or else subsequent priming treatment will not help improve the germination time (MGT) and increasing germination capacity (GC) of the seed. However, an improvement can be seen at as low as 75% of imbibing. This positive effect is due to that the seed have sufficient water to enter phase II of germination, even if it has only absorbed at 75% of water sufficient for completing phase II of the germination.

Example 5—Effects from Prolonged Incubation

To show the positive effect of the water reduction step, a series of experiments were set up where the duration of the incubation step was prolonged:
1. Samples of 10 g or seeds were imbibed after which the MC was reduced, following the present method of the invention.
2. Part of the seeds was incubated for the normal incubation time period, while others were incubated for a prolonged time period.
3. The seeds were dried to the initial MC as before imbibition after the incubation.
4. The incubation moisture content (MC) of seeds, immersion time and priming effect on decreasing mean germination time (MGT) and increasing germination capacity (GC) were determined according to the methods described above.

TABLE 6

Effects from prolonged incubaton

| Species/Variety | MC (%) | Incubation time (h) | MGT (h) | STD MGT | MGT decrease % | GC (%) | STD GC | GC increase % |
|---|---|---|---|---|---|---|---|---|
| Leek Nu | Control | | 102.6 | 1.5 | | 84.5 | 1.9 | |
| Leek Nu | 55* | 96** | 80.5 | 3.4 | 20.9 | 88.5 | 3.4 | 4 |
| Leek Nu | 55 | 144 | 67.8 | 1.9 | 33.9 | 91 | 4.8 | 6.5 |
| Species | | | | | | | | |
| Pepper Nu | Control | | 137.6 | 3 | | 95 | 4.2 | |
| Pepper Nu | 55* | 96** | 91.5 | 0.6 | 33.9 | 98 | 2.6 | 3 |
| Pepper Nu | 55 | 144 | 74.3 | 1.5 | 46.6 | 98.5 | 1 | 3.5 |
| Lettuce Nu | Control | | 45.6 | 1.6 | | 100 | 0 | |
| Lettuce Nu | 55* | 16** | 37.1 | 1.1 | 18.5 | 100 | 0 | 0 |
| Lettuce Nu | 55 | 24 | 34.3 | 0.7 | 24.7 | 99.5 | 0 | −0.5 |
| Lettuce Nu | 55 | 32 | 34.1 | 1.3 | 25.1 | 99 | 1.2 | −1 |

*water content reduced to 1-5% less than immersed seeds.
**Normal incubation time.

Results—Effects from Prolonged Incubaton

The examples illustrate the importance of the water reduction step before incubation. After the water reduction step, a prolonged incubation can be tolerated with far less risk of the seed entering phase III (germination, radical emergence). If the seeds would have entered phase III of the germination during priming, and then dried and stored, properties such as seed vigor, seed viability as well as storability (not shown) would be impaired. As can be seen in table 6, the seeds of the example primed with the method of the present invention could tolerate prolonged incubation with few negative effects.

The invention claimed is:
1. A method of seed priming comprising the steps of:
   (a) wetting a seed to be primed by direct contact with an aqueous solution until the moisture content of the seed is at least 75 wt. % of the moisture content of a saturated seed, wherein the wetting time is shorter than the time required for the seed to enter phase III of water uptake;
   (b) reducing the moisture content of the wetted seed by an amount such that 1 to 20 wt % of the weight gained during the wetting step (a) is lost or such that the weight of the seed is reduced by 1 to 10 wt %, and;
   (c) incubating the seed with reduced moisture content obtained in step (b) in an atmosphere wherein:
      the weight of the seed during the incubation remains at least 80% of the weight of the seed before the incubation in step (c).
2. The method of seed priming according to claim 1, wherein the seed to be primed is wetted until the moisture content of the seed is at least 95 wt. % of the moisture content of a saturated seed.
3. The method of seed priming according to claim 2, wherein the seed to be primed is wetted until the moisture content of the seed corresponds to the moisture content of a saturated seed.
4. The method of seed priming according to claim 1, further comprising the step of providing a dry seed to be primed for the wetting step, wherein said dry seed is a seed:
   from an endosperm species;
   from a gymnosperm species;
   from a perisperm species; or
   a seed having a pericarp.
5. The method of seed priming according to claim 1, wherein the step of wetting the seed comprises immersing said seed into an aqueous solution.
6. The method of seed priming according to claim 5, wherein the aqueous solution is aerated, and optionally stirred, continuously or discontinuously, during the wetting step.
7. The method of seed priming according to claim 1, wherein the moisture content is reduced by blowing air at the wetted seeds, the air having a relative humidity of less than 40% and temperature between 25° C. and 35° C.

8. The method of seed priming according to claim 1, wherein the duration of the step of reducing the moisture content is equal or shorter than one tenth of the time needed for such a seed of the same species to germinate, if having a water content sufficient for completing germination.

9. The method of seed priming according to claim 1, wherein incubating the seed with reduced moisture content comprises incubating the seed under an atmosphere of air having a relative humidity of at least 95%, but less than 100%.

10. The method of seed priming according to claim 1, wherein the relative humidity of the atmosphere during the incubation step is between 80 to 100%.

11. The method of seed priming according to claim 1, wherein the seed with reduced moisture content is being tumbled during the incubation step, and wherein said atmosphere is being continuously or discontinuously replaced during the incubating step.

12. The method of seed priming according to claim 1, wherein the weight of the seed with reduced moisture content during the incubation remains within 20% of the weight of the seed the before the incubation.

13. The method of seed priming according to claim 1, further comprising the step of reducing the moisture content of the seed after the step of incubating the seed.

14. The method of seed priming according to claim 13, wherein the moisture content is reduced to at least to the same level as before said seed priming.

\* \* \* \* \*